(12) United States Patent
Faith et al.

(10) Patent No.: US 8,824,896 B2
(45) Date of Patent: Sep. 2, 2014

(54) SYSTEM FOR OPTICAL OPEN SPACE DATA COMMUNICATION BASED ON DISCRETE OUTPUT LEVELS

(71) Applicant: EADS Deutschland GmbH, Ottobrunn (DE)

(72) Inventors: Thilo Faith, Munich (DE); Christian Blumm, Munich (DE); Josef Schalk, Altheim (DE); Nikolaus Peter Schmitt, Brunnthal-Otterloh (DE); Christoph Heller, Taufkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 1 day.

(21) Appl. No.: 13/749,111

(22) Filed: Jan. 24, 2013

(65) Prior Publication Data

US 2013/0195464 A1    Aug. 1, 2013

(30) Foreign Application Priority Data

Jan. 26, 2012    (DE) .......................... 10 2012 001 398

(51) Int. Cl.
*H04B 10/00* (2013.01)
*H04B 10/114* (2013.01)

(52) U.S. Cl.
CPC .......... *H04B 10/114* (2013.01); *H04B 10/1141* (2013.01)
USPC ........... 398/130; 398/128; 398/118; 398/119; 398/124; 398/127; 398/120

(58) Field of Classification Search
USPC ......... 398/118, 119, 120, 124, 125, 127, 128, 398/130, 131, 135, 136, 140, 182, 183, 172, 398/96
See application file for complete search history.

(56) References Cited

U.S. PATENT DOCUMENTS

| 6,775,480 | B1 | 8/2004 | Goodwill | |
|---|---|---|---|---|
| 7,546,038 | B2 * | 6/2009 | Wang et al. | 398/118 |
| 8,554,084 | B2 * | 10/2013 | Song et al. | 398/172 |
| 2002/0126338 | A1 | 9/2002 | Volpi et al. | |
| 2009/0297167 | A1 | 12/2009 | Nakagawa et al. | |

FOREIGN PATENT DOCUMENTS

| DE | 10 2007 043 255 A1 | 3/2009 |
|---|---|---|
| WO | 2008/001262 A1 | 1/2008 |

* cited by examiner

*Primary Examiner* — Hanh Phan
(74) *Attorney, Agent, or Firm* — Hoffmann & Baron, LLP

(57) ABSTRACT

A system for open space data communication comprising a transmitting device and an optical receiver using multiple varying levels of emitted radiation output. The transmitting device includes multiple emitter groups that are capable of being switched on and off and each of which can be activated in parallel to emit fixed, varying radiation outputs. A total radiation output emitted by the transmitting device is defined by a sum of the emitted radiation outputs of the emitter groups, wherein to transmit a bit vector ($b_0 \ldots b_n$) an emitter group assigned to a most significant bit ($b_0$) emits a maximum radiation output $P_{max}$ and emitter groups assigned to the less significant bits ($b_1 \ldots b_n$) of the bit vector emit radiation outputs: $P_x = P_{max}/2^x$ where $x = 1 \ldots n$.

20 Claims, 1 Drawing Sheet

SYSTEM FOR OPTICAL OPEN SPACE DATA COMMUNICATION BASED ON DISCRETE OUTPUT LEVELS

CROSS REFERENCE TO RELATED APPLICATION

This application claims priority to German Patent Application No. 102012001398.1, filed on Jan. 26, 2012, which is incorporated herein by reference in its entirety.

BACKGROUND

1. Field of Technology

The present disclosure relates to a system for optical, open space data communication by means of digital signals between an optical transmitting device and an optical receiver utilizing optical radiation modulated by an array of emitters, which emit radiation at multiple levels of varying radiation output, wherein the information carrier is formed by the output of the emitted radiation.

2. Brief Discussion of Related Art

Modern mobile data processing systems require high data transmission bandwidths for such applications as the Internet or for high-quality audio and/or video streaming. Currently, data is transmitted predominantly in the radio frequency band (RF); however, the increase in number of such data transmission systems is leading to increased exhaustion of the available frequency bands. For this reason, efforts are being made to implement such data transmission using optical open space data communication systems. In these systems data is transmitted between an optical transmitter and an optical receiver by modulating the radiation output (or optical power output or light intensity) emitted by the transmitter. During transmission a primarily direct visual contact between the transmitter and the receiver is utilized. However, it is also possible to carry out an optical transmission using diffused light. A further advantage of such optical open space data communication systems is that it is possible to comply with strict requirements relating to electromagnetic compatibility, such as, for example, in hospitals or in sensitive industrial facilities.

The simplest type of optical data transmission is binary data transmission via a pulsed radiation source, that is, the switching on and off of the radiation source or operating with two different light intensities. However, only a limited data rate is achievable with this type of data transmission.

In contrast, the so-called orthogonal frequency division multiplexing method (OFDM) is a suitable method of transmission with which it is possible to achieve high transmission rates, even in situations involving multi-path reception. A major disadvantage of this method is that it necessitates employing complex transmitter devices (whether in the radio or optical range) with very high linearity and a large dynamic range. For transmitting optically in open space, laser diodes or LEDs in the visible or infrared spectrum are generally used, because these alone are fast enough to convert an electrical current modulated with multiple MHz to a modulated radiation output. The main disadvantage of LEDs is that the relation between emitted radiation output and electrical current is to a high degree non-linear. The resulting non-linearities are problematic, especially in conjunction with the OFDM method, and they result in poor signal/noise ratios (SNR) or poor signal/interference plus noise ratios (SINR) and, accordingly, in reduced transmission quality, if complex and costly technical measures for purposes of linearization are not undertaken. Moreover, such traditional transmitting devices require digital-to-analog converters and transconductance amplifiers which exhibit low energy efficiency at high frequencies and bandwidths.

An arrangement of the aforementioned kind is known from DE 102007043255 A1 in which as many radiation emitters are present as are discrete values to be transmitted. For example, there are 255 emitters in the transmission of an 8-bit signal.

Systems for optical data communication having a transmitting device as well as an optical receiver are known from U.S. 2009/0297167 A1, U.S. 2002/0126338, U.S. 6775480 B1 and WO 2008/001262 A1, in which the transmitting device comprises a modulator for modifying the emitted radiation.

SUMMARY

Thus, the object of the present disclosure is to circumvent the aforementioned disadvantages and to provide a transmitting device for optical open space data communication, which can be produced with minimal structural expenditure and can be operated with minimal energy consumption.

The object is achieved as set forth in the features of claim 1. Advantageous modifications and arrangements are the subject matter of the dependent claims. Additional features, possible applications and advantages of the disclosure are set forth in the following description and in the explanation of the example embodiments of the disclosure as represented in the drawings.

In particular, the objective is achieved by providing a transmitting device for optical open space data communication having an optical receiver, and using optical radiation modulated by means of an emitter array which emits radiation at multiple levels of varying radiation output. In this arrangement, an information carrier is formed by the output of the emitted radiation. The emitter array described comprises multiple emitter elements that can be switched on and off, each of which, being arranged in parallel emitter groups, can be activated to emit fixed varying radiation outputs, wherein the total radiation output emitted by the emitter array is defined by the sum of the emitted radiation outputs of all emitter elements. As part of this arrangement, an emitter group is assigned to each bit for transmitting a bit vector $(b_0 \ldots b_n)$, wherein the emitter group assigned to the most significant bit $b_0$ emits a maximum radiation output $P_{max}$ and the emitter groups assigned to the less significant bits $(b_1 \ldots B_n)$ of the bit vector emit the following radiation outputs: $P_x = P_{max}/2^x$ where $x = 1 \ldots n$.

In this way it is possible in a structurally simple manner to transmit digital data via the analog transmission of electromagnetic waves (light waves) that exhibit very high linearity. In other words, it is possible to implement a highly linear digital-to-analog converter which emits an analog light intensity based on a digital input signal.

This solution makes it possible to advantageously utilize the full dynamic range of LEDs or laser diodes, resulting in a more economic use of the radiation output. In addition, the costs and complexity of the transmitting device are reduced considerably, since neither digital-to-analog converters nor complex, sufficiently fast current control devices are required. Once the problem of systemic non-linearity is solved, complex linearization circuitry and equalization techniques can be eliminated, thereby making possible a cost effective and structurally simple transmitting device. Finally, with the non-linearization problem solved, the signal-to-noise ratio during optical data transmission is improved, which can result in an increase in data throughput and/or the transmission range.

According to an advantageous modification, each of the emitter groups includes one or more light emitting diodes (LEDs) or laser diodes, which are connected preferably in series in order to enhance the radiation output. These LEDs may radiate in the visible or infrared spectrum.

According to an advantageous modification, each of the emitter groups is operated using different optical power outputs for emitting different radiation outputs. In accomplishing this, either an identical number of emitters can be combined to form an emitter group and operated using different electrical currents depending on the emitter group, or else a varying number of emitters per emitter group can be operated, each using the same electrical currents. The electrical currents can be provided, for example, by way of adapted series resistors or constant current devices. This characteristic of the transmitting device is advantageous, for example, when using the OFDM-type modulation.

According to an advantageous modification, each of the emitter groups includes a different number of emitters for emitting different radiation outputs. For example, an emitter group may consist of just one emitter, another group of two emitters, one group of four emitters, etc.

According to an advantageous modification, at least several emitter groups for emitting different radiation outputs include different types of emitters which emit different radiation outputs. In this way it is possible in a structurally simple manner to achieve optimum operation of the emitter elements that have very different radiation outputs.

According to an alternative advantageous modification, each of the optical power outputs of the individual emitter groups is equally high. In this case, different numbers of emitter groups (e.g., 1, 2, 4, 8, ...) are logically combined and switched on and off together as a combined group via the respective individual bits ($b_0 \ldots b_n$) of the bit vector.

The individual groups are thus in turn combined to form macro-groups that are jointly switched on and off. For example, a first macro-group M1 includes one emitter group, a second macro-group M2 includes two emitter groups, a third macro-group M3 includes four emitter groups, etc. The result of this is in turn a gradation corresponding to $P_x=P_{max}/2^x$. The advantage of this is that all emitter groups can be structurally identical; hence, all of the individual series resistors can be identical and do not have to be adapted to one another in order to realize $P_x=P_{max}/2^x$. Thus, this solution reduces the implementation expenditure. Furthermore, it is possible in such case to dispense with a fine adjustment of the optical transmission outputs of the individual emitter groups as described above.

According to an alternative advantageous modification, each of the optical power outputs of the individual emitter groups are also the same, but are not combined to form additional logical groups. In this case, the data to be transmitted are represented by the number of active emitter groups. For this purpose the decimal notation of the bit vector ($b_0 \ldots b_n$) determines the number of the emitter groups to be switched on. For example, the bit vector "1 0 1 1" would correspond to "11" such that, logically, 11 emitter groups would be activated. This characteristic of the transmitting device is especially suited to the PAM modulation method (pulse amplitude modulation).

According to an advantageous modification, the emitters of the emitter groups are arrayed in a matrix, wherein the emitters belonging to an emitter group are arrayed in a diagonal matrix or in parallel thereto. In this way, good homogeneity can be achieved for the totality of the emitted light intensity, largely independent of which of the emitter groups are switched on and which are switched off.

According to an alternative advantageous modification, the emitters are disposed in multiple polygonal arrays that are concentric to one another. In this arrangement, preferably the emitters of the emitter group operated by the highest radiation output form an inner polygonal array, and the emitters of the emitter groups operated with lower radiation outputs form at least one outer and, if necessary, additional outer polygonal arrays which alternate with one another. For this configuration as well, good homogeneity can be achieved for the totality of the emitted light intensity, largely independent of which of the emitter groups is switched on and which is switched off.

According to an advantageous modification, a transmitting device for optical open space data communication is provided, which comprises a transmitting device according to any of the above described embodiments, wherein the device has a bandwidth control of 5 MHz to 50 MHz.

According to an advantageous modification, the OFDM modulation method (orthogonal frequency division multiplexing) or the OFDMA modulation method (orthogonal frequency division multiple access) is used in conjunction with the transmitting device. Both methods allow for very high data transmission rates. Alternatively, other methods of modulation based on different intensity levels can also be employed.

According to an advantageous modification, code division multiple access (CDMA) transmission method or a variation thereof is used in conjunction with the transmitting device.

According to an advantageous modification, pulse amplitude modulation (PAM) method or another modulation method based on different intensity levels is used in conjunction with the transmitting device. The advantage of this is a simple implementation and feasibility of digital signal processing on the transmitter and receiver side.

According to an advantageous modification, carrier modulation methods such as phase shift keying (PSK) or Gaussian minimum shift keying (GMSK) are used in conjunction with the transmitting device. This offers the advantage of a constant envelope of the transmit signal, so that no problems arise with respect to peak-to-average-power-ratio (PAPR), such as in the case of OFDM.

According to an advantageous modification, the emitter elements are light emitting diodes (LEDs). According to another advantageous modification, emitter elements in the form of laser diodes are used. In principle, any other, even future optical radiation sources can be used as emitter elements, as long as they include the requisite bandwidth control. The system disclosed herein is preferably used in an aircraft, a motor vehicle or in the home and office.

Further advantages, features and details are set forth in the following description, in which—with reference to the drawings—at least one example embodiment is described. Features that are described and/or depicted alone, or in any meaningful combination, form the subject matter of the disclosure that can stand on their own. Identical, similar and/or functionally equivalent parts are designated with the identical reference numerals.

DETAILED DESCRIPTION

Figure 1:
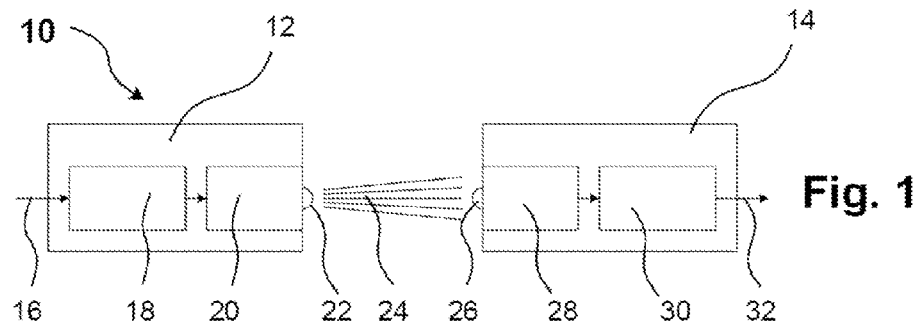
FIG. 1 is a schematic overview of an optical data transmission system.

FIG. 1 shows a schematic overview of an optical data transmission system 10 comprising a transmitting device 12 and a receiving device 14. A digital data stream 16 to be transmitted is fed to the transmitting device 12 and arrives in a modulator 18 which converts the data stream 16 to a signal that can be transmitted by means of an optical beam. The output of the modulator 18 is merely a digital signal. For modulation techniques other than an on/off circuit, this can be a transmit vector which represents an analog signal value. A transmitting device (front end) 20 transforms the transmit vector into an actual optical signal (an emitted light intensity or radiation output) by controlling a suitable radiation source 22 (emitter). The radiation 24 emitted by the radiation source 22 is captured by a suitable radiation detector 26, converted to an electric signal and fed to a receiver 28. An example of a radiation detector 26 is a photo diode which converts the optical output to an electrical current. The receiver 28 amplifies and filters the received signal and then converts it to a digital signal which is processed in a demodulator 30. The demodulator 30 reproduces the transmitted data stream 32 and passes it on for further use.

Figure 2:
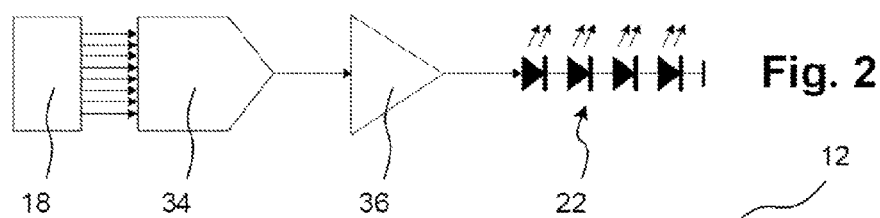
FIG. 2 is a schematic view of a traditional transmitting device.

FIG. 2 is a schematic view of a traditional transmitting device, in which the signal of the modulator 18 is converted by a digital-to-analog converter 34 to an analog voltage, which in turn is converted by a transconductance amplifier 36 to a current signal which activates the radiation source 22, an LED row in the example shown in FIG. 2.

Figure 3:
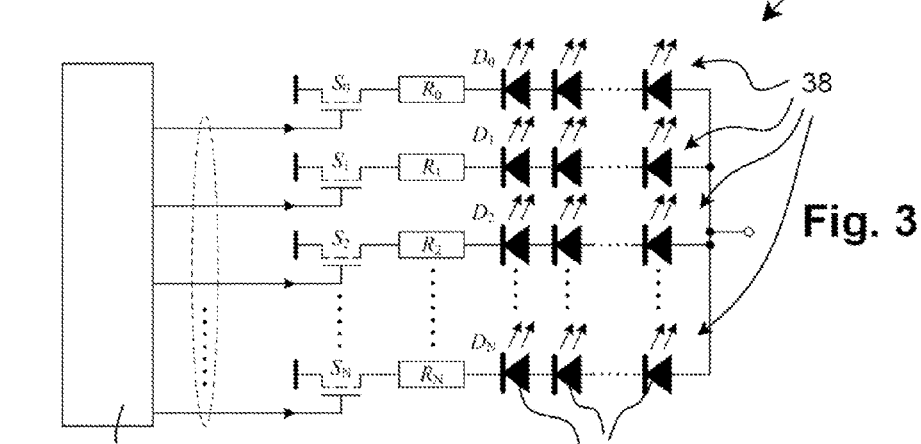
FIG. 3 is a schematic view of a transmitting device according to the present disclosure.

FIG. 3 shows a schematic view of a transmitting device 12 according to the present disclosure, which includes a number N+1 of emitter groups 38 ($D_0$-$D_N$). Each emitter group $D_i$ includes a number of radiation emitters 39 connected in series and each is set to a constant radiation output by means of an independent series resistor $R_i$. The number of radiation emitters 39 can differ for each emitter group 38. Assuming $P_{max}$ corresponds to a maximum possible radiation output of an emitter group 38, the series resistor $R_0$ is adjusted so that when the semiconductor switch $S_0$ is properly connected, the maximum possible radiation output $P_{max}$ is generated in the emitter group $D_0$. The emitter groups $D_1$-$D_N$ are operated with correspondingly low currents such that the emitted radiation output in the emitter group $D_1$ is $P_1 = P_{max}/2$, in the emitter group $D_2$, $P_2 = P_{max}/4$, in the emitter group $D_N$, $P_N = P_{max}/2^N$.

The emitter group $D_0$ is switched on or off by the semiconductor switch $S_0$ in accordance with the most significant bit of the bit vector generated by modulator 18. Accordingly, the emitter group $D_1$ is switched by the semiconductor switch $S_1$ in accordance with the second most significant bit of the bit vector. This applies analogously to the other emitter groups $D_2$-$D_N$. Accordingly, the circuit shown in FIG. 3 behaves like a direct digital input-to-analog output converter with a resolution of N+1 bits. Here, N can be selected at random according to the desired resolution. Suitable values for N are from 2 to 10.

In this arrangement the radiation outputs of the individual emitter groups 38 should be adjusted very precisely by setting the appropriate series resistors $R_i$, for example, using an optical radiometer so that the superimposed radiation of all emitter groups 38 exhibits the greatest possible linearity.

The semiconductor switches $S_0$ to $S_N$ used should be fast solid state switches such as transistors or MOSFET switches.

By way of example, to transmit a bit vector (0,1,0,1,1,0,0,1), that is, in this example assuming N=7, the semiconductor switches $S_0$, $S_2$, $S_5$, $S_6$, are disabled, that is open, whereas the remaining semiconductor switches $S_1$, $S_3$, $S_4$, $S_7$ are conductive and, accordingly, current flows through the emitter groups $D_1$, $D_3$, $D_4$, $D_7$ and each of these emits light of an individually prescribed intensity. The totality of the radiation emitted by the emitter groups $D_1$, $D_3$, $D_4$, $D_7$ is proportional to the analogous value of the bit vector. To then transmit the next bit vector, the corresponding emitter groups are conductively connected or disabled. Preferably, data is transmitted at a bandwidth or switching frequency of the semiconductor switches of approximately 5 MHz to 100 MHz.

Figures 4, 5:
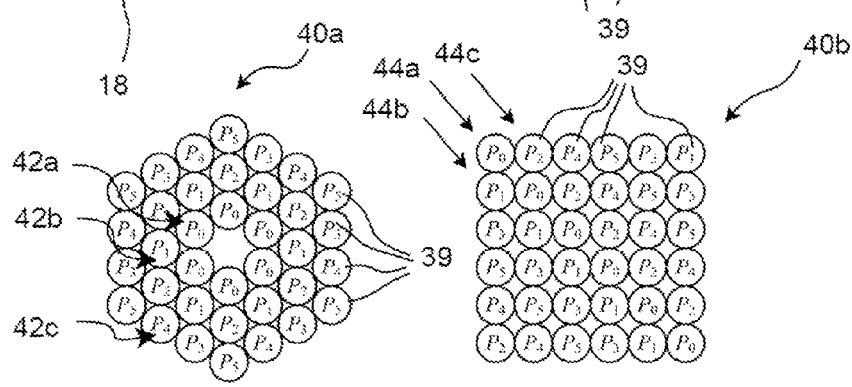
FIG. 4 is a representation of a first emitter array.
FIG. 5 is a representation of a second emitter array.

FIG. 4 shows a first emitter array 40a for a 6-bit vector which includes individual light emitting diodes or laser diodes of all the emitter groups 38. This emitter array 40a includes multiple concentric polygonal arrays (here hexagonal arrays) 42a, 42b, 42c of LEDs. In this arrangement, the six LEDs of emitter group $D_0$ with the output $P_0$ are disposed in the innermost hexagonal array 42a. Disposed outward thereof in the second hexagonal array 42b, there are the 12 LEDs of emitter groups $D_1$ and $D_2$ with the respective outputs $P_1$ and $P_2$. Disposed outward thereof in the third hexagonal array 42c, there are the 18 LEDs of emitter groups $D_3$, $D_4$ and $D_5$ with the respective outputs $P_3$, $P_4$ and $P_5$.

Additional concentric polygonal arrays with additional emitters can be provided further outwardly of the polygonal arrays 42a, 42b, 42c. In such case it is preferable to use emitters with a wide radiating angle.

FIG. 5 shows a second emitter array 40b, which also includes individual light emitting diodes or laser diodes of all emitter groups 38. In this emitter array 40b the six emitters of emitter group $D_0$ with the output $P_0$ form a diagonal 44a of a matrix or of a rectangle or of a square including the individual emitters. Furthermore, five emitters of the emitter group $D_1$ with an output $P_1$ form a row 44b that is parallel to the diagonal 44a, and five emitters of emitter group $D_2$ with an output $P_2$ form a second parallel row 44c on the other side of the diagonal 44a and so forth, such that the remaining emitters of the individual groups are arranged in additional rows that are parallel to the diagonal 44a situated further outwardly.

LIST OF REFERENCE NUMERALS

10 data transmission system;
12 transmitting device;
14 receiving device;
16 data stream;
18 modulator;
20 transmitter superstructure;
22 radiation source;
24 radiation;
26 radiation detector;
28 receiver superstructure;
30 demodulator;
32 digital signal;
34 digital-to-analog converter;
36 transconductance amplifier;
38 emitter group;
39 radiation emitter;
40a, b emitter array;
42a, b, c polygonal array; and
44a, b, c diagonals.

What is claimed is:

1. A system for optical open space data communication using digital signals, the system comprising a transmitting device and an optical receiver and using multiple, varying levels of emitted radiation outputs, wherein the transmitting device comprises multiple emitter groups that are capable of being switched on and off, each of which is capable of being activated in parallel to emit fixed, varying radiation outputs, wherein a total radiation output emitted by the transmitting device is defined by a sum of the emitted radiation outputs of the emitter groups, wherein to transmit a bit vector ($b_0 \ldots b_n$)

an emitter group assigned to a most significant bit ($b_0$) emits a maximum radiation output $P_{max}$ and emitter groups assigned to less significant bits ($b_1 \ldots b_n$) of the bit vector emit radiation outputs $P_x = P_{max}/2^x$, where $x = 1 \ldots n$.

2. The system according to claim 1, wherein each of the emitter groups is formed from one or more emitters selected from light emitting diodes (LEDs), laser diodes or a combination of both.

3. The system according to claim 1, wherein several of the emitter groups are capable of being operated with different electrical currents or electrical power inputs to emit different radiation outputs.

4. The system according to claim 1, wherein currents of the emitter groups are selected so that optical power outputs of individual emitter groups are the same, and different levels of total emitted optical radiation output are achieved by combination of individual emitter groups to form logical groups which have different numbers of individual emitter groups or by total number of activated emitter groups.

5. The system according to claim 1, wherein several of the emitter groups have a different number of emitters to emit different radiation outputs.

6. The system according to claim 1, wherein several of the emitter groups have an equal number of emitters to emit different radiation outputs.

7. The system according to claim 1, wherein to emit different radiation outputs, at least several of the emitter groups have different types of emitters which emit different radiation outputs.

8. The system according to claim 1, wherein emitters of the emitter groups are spatially arrayed to achieve maximum homogeneity of the emitted output across a beam cross-section.

9. The system according to claim 1, wherein emitters of the emitter groups are arrayed in a matrix, wherein an emitter group belonging to a bit is arranged in the matrix as a diagonal or in parallel to the diagonal.

10. The system according to claim 1, wherein emitters of the emitter groups are disposed in several polygonal arrays that are concentric to one another.

11. The system according to claim 1, wherein emitters of an emitter group operated with highest radiation output form an inner polygonal array, and emitters of emitter groups operated with the lower radiation outputs form alternately with respect to their radiation output, at least one outer polygonal array in relation to the inner polygonal array.

12. The system according to claim 1, wherein the at least one outer polygonal array includes a first outer polygonal array and a second outer polygonal array arranged outwardly of the first outer polygonal array.

13. The system according to claim 1, wherein the system has a bandwidth control of from 5 MHz to 100 MHz.

14. The system according to claim 1, wherein the system is capable of being operated by orthogonal frequency division multiplexing (OFDM), orthogonal frequency division multiple access (OFDMA) or a variation thereof.

15. The system according to claim 1, wherein the system is capable of being operated by pulse amplitude modulation (PAM) or another modulation based on different intensity levels.

16. The system according to claim 1, wherein emitters of the emitter groups are light emitting diodes, laser diodes, or combinations thereof.

17. An aircraft comprising a transmitting device having multiple emitter groups that are capable of being switched on and off, each of which is capabale of being activated in parallel to emit fixed, varying radiation outputs, wherein a total radiation output emitted by the transmitting device is defined by a sum of the emitted radiation outputs of the emitter groups, wherein to transmit a bit vector ($b_0 \ldots b_n$) an emitter group assigned to a most significant bit ($b_0$) emits a maximum radiation output $P_{max}$ and emitter groups assigned to less significant bits ($b_1 \ldots b_n$) of the bit vector emit radiation outputs $P_x = P_{max}/2^x$, where $x = 1 \ldots n$.

18. The aircraft according to claim 17, wherein each of the emitter groups is formed from one or more emitters selected from light emitting diodes (LEDs), laser diodes or a combination of both.

19. The aircraft according to claim 17, wherein emitters of the emitter groups are arrayed in a matrix, wherein an emitter group belonging to a bit is arranged in the matrix as a diagonal or in parallel to the diagonal.

20. The aircraft according to claim 17, wherein emitters of the emitter groups are disposed in several concentric polygonal arrays.

* * * * *